(12) United States Patent
Chou

(10) Patent No.: US 6,776,429 B2
(45) Date of Patent: Aug. 17, 2004

(54) BICYCLE HAVING A CRANK MECHANISM FOR ADJUSTING POSITION OF A HANDLE RELATIVE TO A HEAD TUBE

(75) Inventor: Joe Chou, Tai Ping (TW)

(73) Assignee: Giant Manufacturing Co., Ltd., Taichung Hsien (TW)

( * ) Notice: Subject to any disclaimer, the term of this patent is extended or adjusted under 35 U.S.C. 154(b) by 0 days.

(21) Appl. No.: 10/234,100

(22) Filed: Sep. 5, 2002

(65) Prior Publication Data

US 2003/0214112 A1 Nov. 20, 2003

(51) Int. Cl.[7] .................................................. B62K 1/00
(52) U.S. Cl. ...................... 280/279; 280/287; 74/551.3; 74/493
(58) Field of Search ...................... 74/493, 488, 551.1, 74/551.3, 551.7; 280/279, 276, 287, 278, 775

(56) References Cited

U.S. PATENT DOCUMENTS

| | | | | | |
|---|---|---|---|---|---|
| 5,138,900 A | * | 8/1992 | Hals | ........................... | 74/551.7 |
| 5,241,881 A | * | 9/1993 | Chen | ........................... | 74/551.2 |
| 5,273,302 A | * | 12/1993 | Ureel | ........................... | 280/279 |
| 5,323,664 A | * | 6/1994 | Fairfield et al. | ........... | 74/551.3 |
| 5,887,490 A | * | 3/1999 | Dittmar | ....................... | 74/551.3 |
| 6,206,395 B1 | * | 3/2001 | Young | ......................... | 280/278 |
| 6,467,787 B1 | * | 10/2002 | Marsh | ......................... | 280/279 |

FOREIGN PATENT DOCUMENTS

| | | | | | |
|---|---|---|---|---|---|
| DE | 3831868 A1 | * | 6/1990 | ........... | B62K/15/00 |
| JP | 404100789 A | * | 4/1992 | ................. | 280/278 |
| WO | WO9418057 | * | 8/1994 | ........... | B62K/21/14 |

* cited by examiner

*Primary Examiner*—Daniel G. DePumpo
(74) *Attorney, Agent, or Firm*—Harness, Dickey & Pierce, P.L.C.

(57) ABSTRACT

A bicycle includes a stem extending downwardly from a handle, and a crank mechanism interconnecting the stem and a head tube. The crank mechanism includes a frame fixed on the head tube, a lever pivoted to a front end of the frame and extending uprightly therefrom, a crank pivoted to the rear end of the frame and extending uprightly therefrom, and a coupler member pivoted to an upper end of the crank and movably connected to an upper end of the lever so as to permit co-movement of the lever, the crank and the coupler member relative to the frame and so as to permit frontward and rearward movement of the handle together with the stem relative to the head tube. A locking unit is selectively and movably connected to two of the frame, the lever, the crank and the coupler member, and is operable between locking and unlocking positions.

1 Claim, 12 Drawing Sheets

BICYCLE HAVING A CRANK MECHANISM FOR ADJUSTING POSITION OF A HANDLE RELATIVE TO A HEAD TUBE

BACKGROUND OF THE INVENTION

1. Field of the Invention

The present invention relates to a bicycle, more particularly to a bicycle having a crank mechanism for adjusting position of a handle relative to a head tube.

2. Description of the Related Art

Referring to FIG. 1, a conventional bicycle 10 is shown to include a handle 13, a stem 12 that extends downwardly from the handle 13, and a head tube 111 which permits extension of the stem 12 therethrough to connect a fork assembly (not shown) that holds a front wheel thereon.

Since a pair of clamping plates 121, 122 is used to fasten the stem 12 on the handle 13, the latter cannot be tilted forwardly or rearwardly relative to the head tube 111, thereby inconveniencing the rider of the conventional bicycle 10 when he wishes to adjust position of the handle 13 relative to the head tube 111.

SUMMARY OF THE INVENTION

Therefore, the object of this invention is to provide a bicycle having a crank mechanism for adjusting position of a handle relative to a head tube so as to eliminate the aforesaid disadvantage associated with the prior art.

Accordingly, a bicycle of the present invention includes: a handle; a stem extending downwardly from the handle; a head tube; and a crank mechanism interconnecting the stem and the head tube. The crank mechanism includes a frame fixed on the head tube and having opposing front and rear ends, and a lever pivoted to the front end of the frame, extending uprightly therefrom and having an upper end. A crank is pivoted to the rear end of the frame, extends uprightly therefrom, and has an upper end. A coupler member is pivoted to the upper end of the crank, and is movably connected to the upper end of the lever so as to permit co-movement of the lever, the crank and the coupler member relative to the frame and so as to permit frontward and rearward movement of the handle together with the stem relative to the head tube. The bicycle further includes a locking unit selectively and movably connected to two of the frame, the lever, the crank and the coupler member, and operable between a locking position, in which the locking unit locks the crank, the lever, and the coupler member against movement relative to the frame, and an unlocking position, in which the locking unit releases the crank, the lever and the coupler member so as to permit co-movement of the lever, the crank and the coupler member relative to the frame and so as to permit adjustment of the stem to a desired position relative to the frame.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTION OF THE PREFERRED EMBODIMENTS

Figure 1:
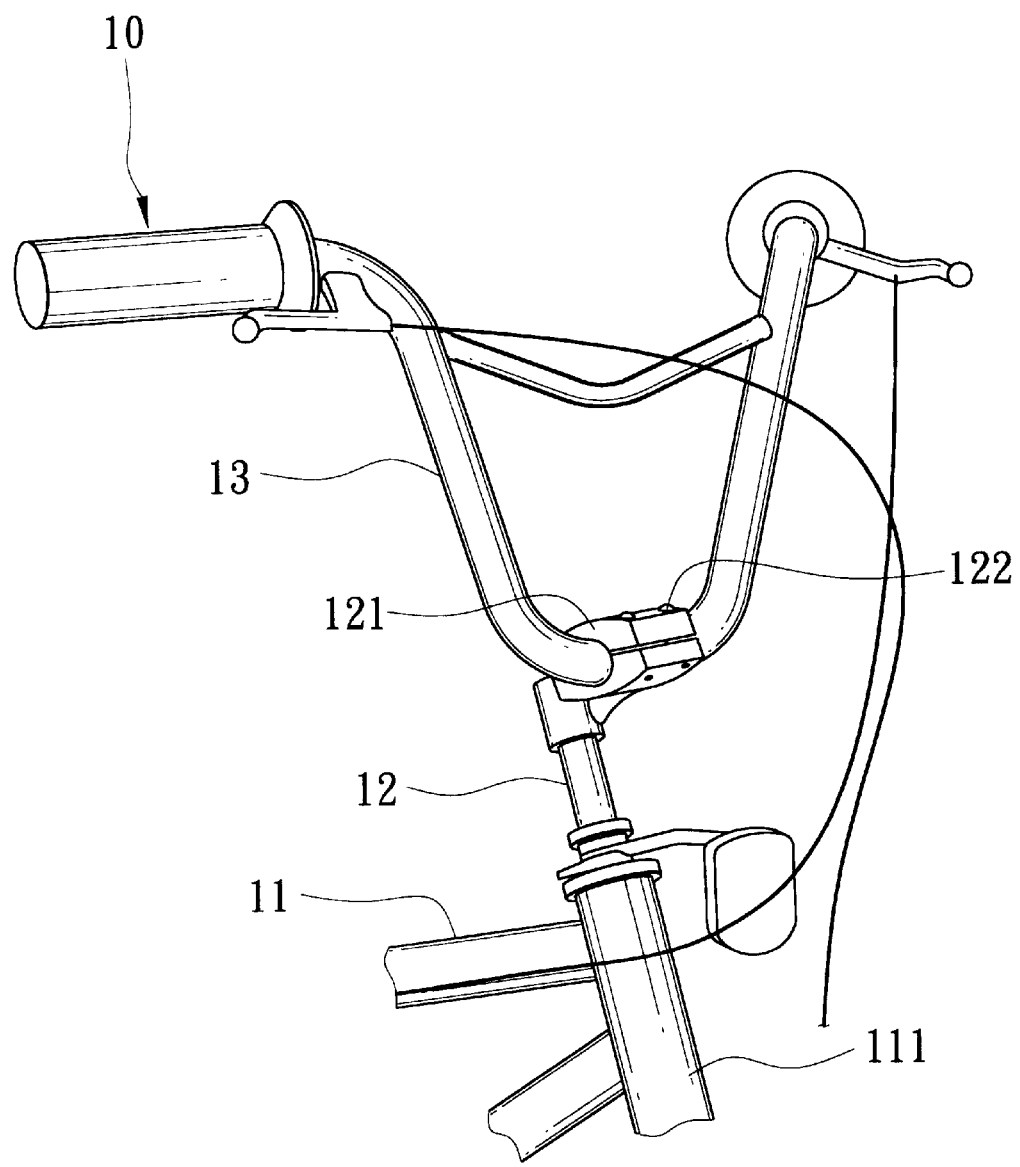
FIG. 1 is a fragmentary perspective view of a conventional bicycle.
Figure 2:
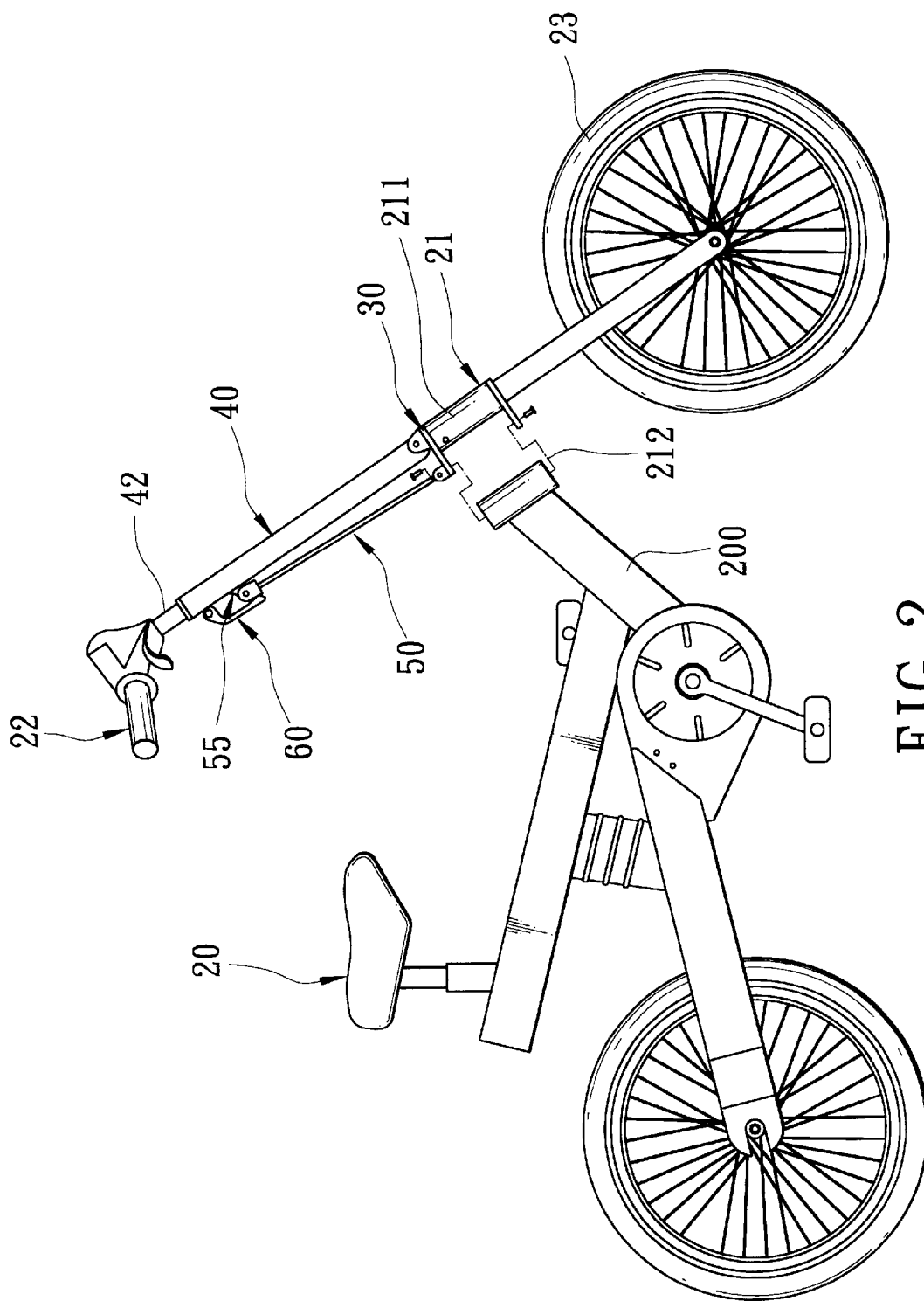
FIG. 2 is a schematic view of a preferred embodiment of a bicycle according to the present invention.
Figure 3:
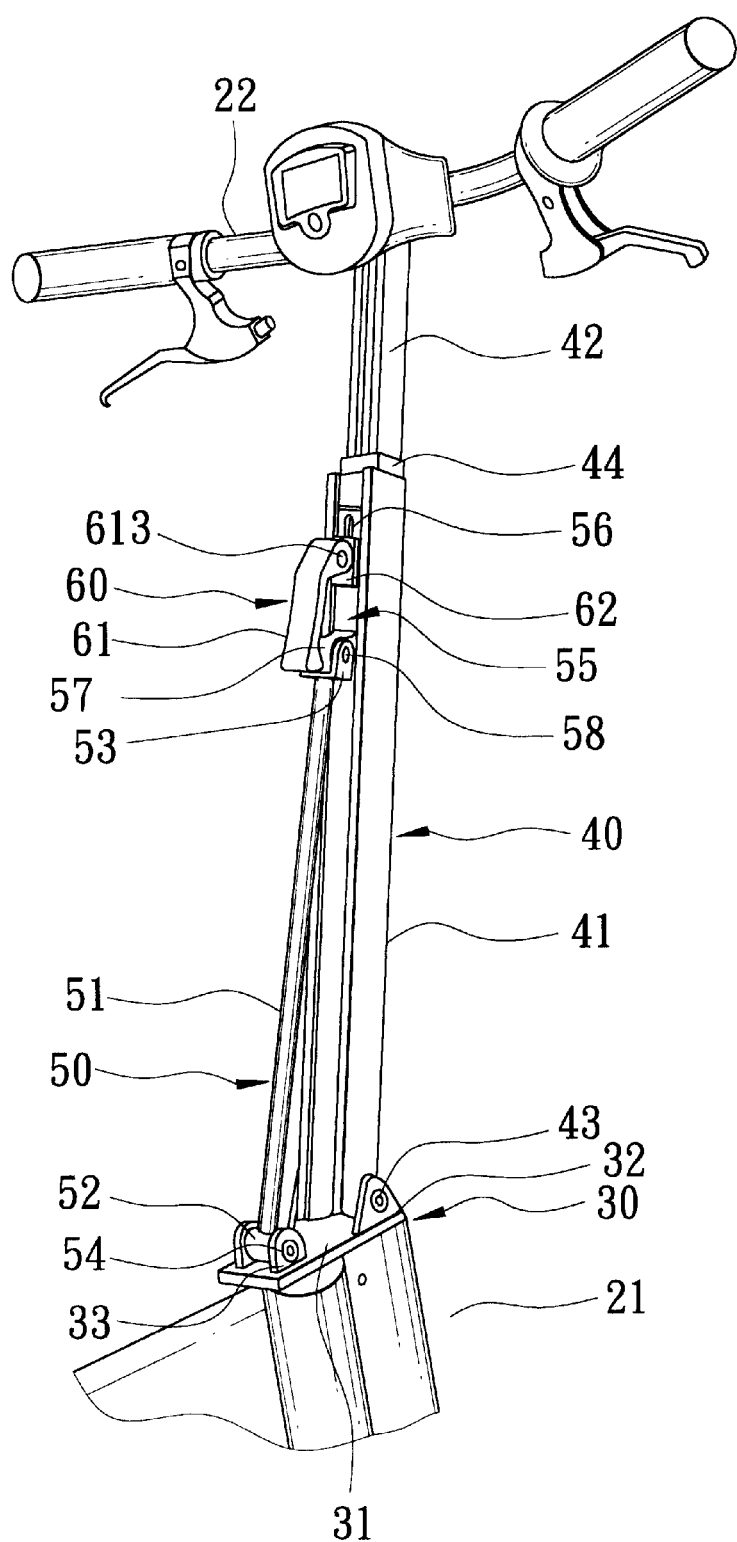
FIG. 3 is a fragmentary perspective view of the preferred embodiment, illustrating how a crank mechanism interconnect a stem and a head tube.
Figure 4:
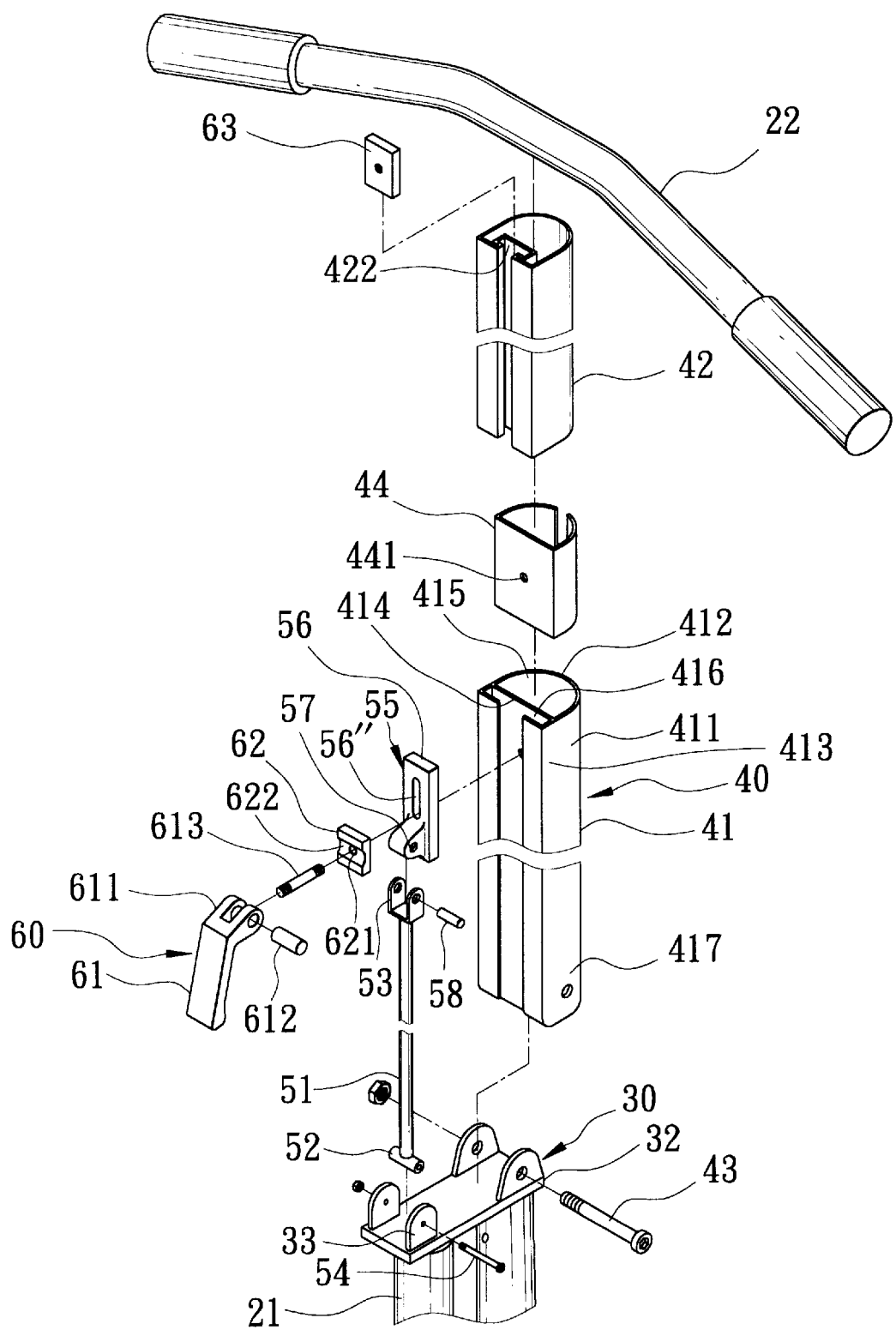
FIG. 4 is an exploded view of the crank mechanism employed of the preferred embodiment.

Referring to FIGS. 2 to 4, the preferred embodiment of a bicycle 20 according to the present invention is shown to include a handle 22, a stem 42, a head tube 21, a crank mechanism 40, and a locking unit 60.

As illustrated, the stem 42 extends downwardly from the handle 22.

The head tube 21 includes a front part 211 that holds a front wheel 23, and a rear part 212 pivoted to a downtube 200 of the bicycle 20.

The crank mechanism 40, such as a four-bar linkage mechanism, interconnects the stem 42 and the head tube 21, and includes a frame 30, a lever 41, a crank 51, and a coupler member 55. The frame 30 is fixed on the front part 211 of the head tube 21, and has opposing front and rear ends 32, 33. The lever 41 has a lower end 417 pivoted to the front end 32 of the frame 30 via a pivot pin 43, and an upper end 412. The crank 51 has a lower end 52 pivoted to the rear end 33 of the frame 30 via a pivot pin 54, and an upper end 53. The coupler member 55 is pivoted to the upper end 53 of the crank 51 via a pivot pin 58, and is movably connected to the upper end 412 of the lever 41 so as to permit co-movement of the lever 41, the crank 51 and the coupler member 55 relative to the frame 30 and so as to permit frontward and rearward movement of the handle 22 together with the stem 42 relative to the head tube 21.

Figure 5:
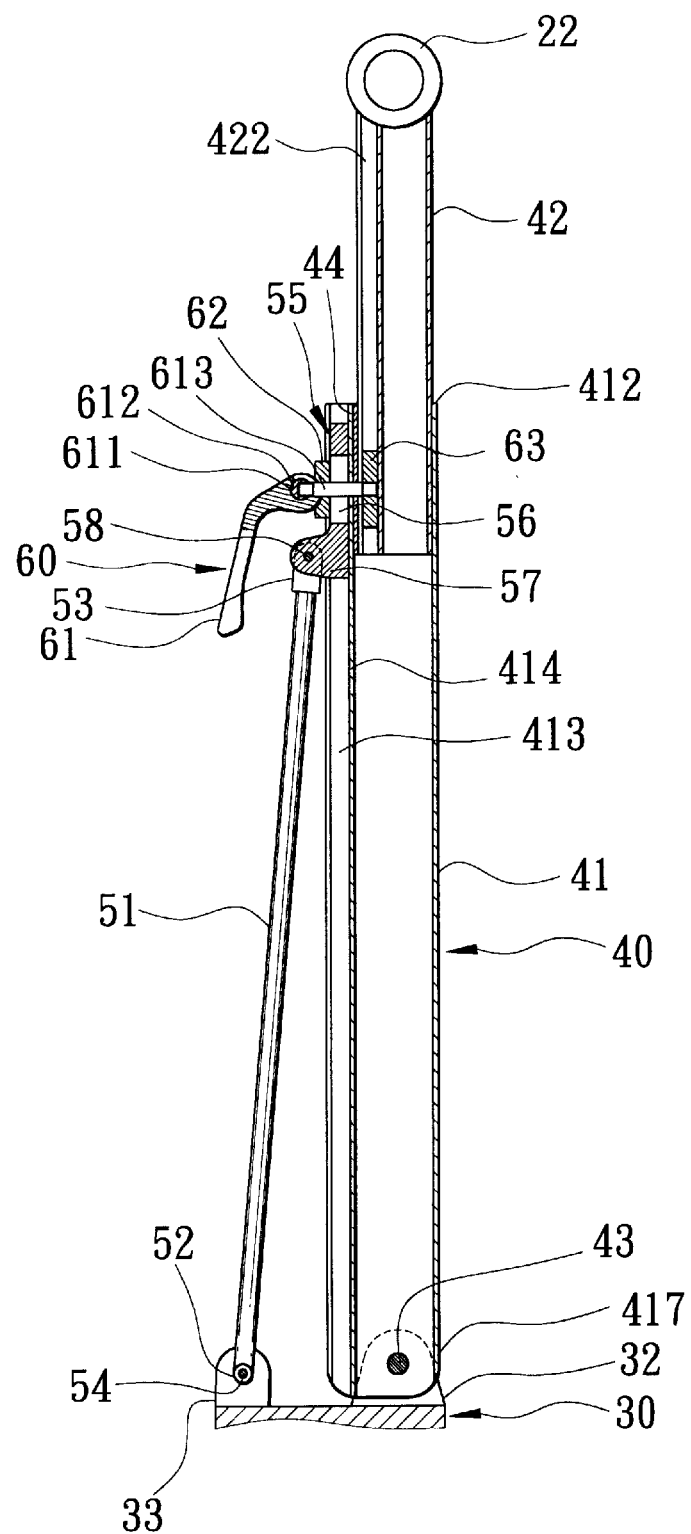
FIG. 5 illustrates the crank mechanism of the preferred embodiment in a locking position to prevent adjustment of the stem relative to the head tube.
Figure 6:
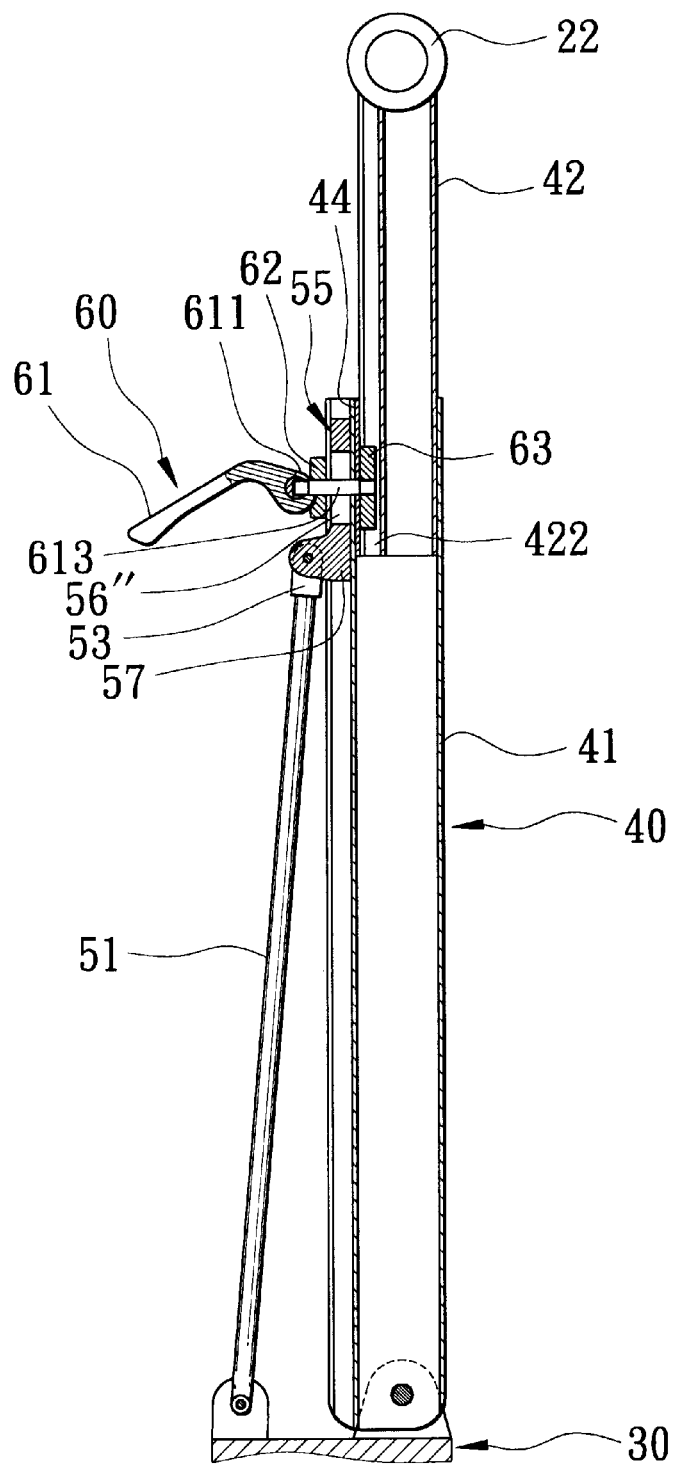
FIG. 6 illustrates the crank mechanism of the preferred embodiment in an unlocking position.
Figure 7:
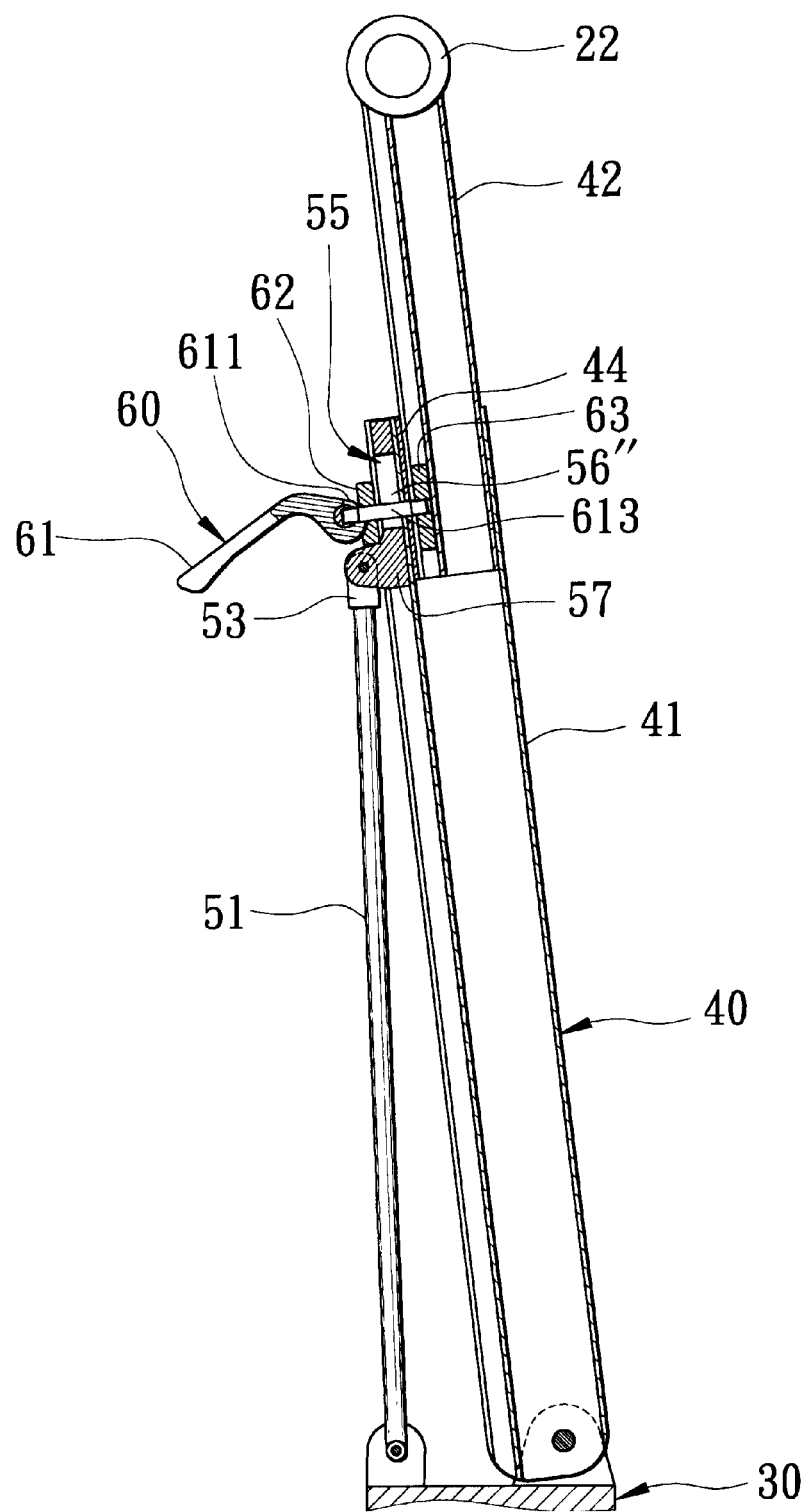
FIGS. 7 and 8 illustrate how the stem is adjusted relative to the head tube when the crank mechanism is at the unlocking position.

The locking unit 60 is selectively and movably connected to two of the frame 30, the lever 41, the crank 51 and the coupler member 55, and is operable between a locking position, as best shown in FIG. 5, in which the locking unit 60 locks the crank 51, the lever 41, and the coupler member 55 against movement relative to the frame 30, and an unlocking position, as best shown in FIG. 6, in which the locking unit 60 releases the crank 51, the lever 41 and the coupler member 55 so as to permit co-movement of the lever 41, the crank 51 and the coupler member 55 relative to the frame 30 and so as to permit adjustment of the stem 42 to a desired position relative to the frame 30, as best shown in FIG. 7.

In the preferred embodiment, the lever 41 includes a front portion 411 defining a stem channel 415 that extends downwardly in a longitudinal direction from the upper end 412 of the lever 41 toward the frame 30 and that receives the stem 42 therein, and a rear portion 413 defining a coupler channel 416 that extends downwardly in the longitudinal direction from the upper end 412 of the lever 41 toward the frame 30. The coupler member 55 includes a sliding plate 56 that is slidably disposed in the coupler channel 416 and that has a projection 57 protruding rearwardly from the sliding plate 56. The upper end 53 of the crank 51 is pivoted to the projection 57 by the pivot pin 58. A friction reducing sleeve 44 is disposed in the stem channel 415 between the lever 41 and the stem 42.

The lever 41 further includes a partition plate 414 that is disposed between the front and rear portions 411, 413 and that confines a front side of the coupler channel 416. The sliding plate 56 is formed with an elongated slot 56" that is disposed above the projection 57 and that extends in the longitudinal direction.

Figure 8:
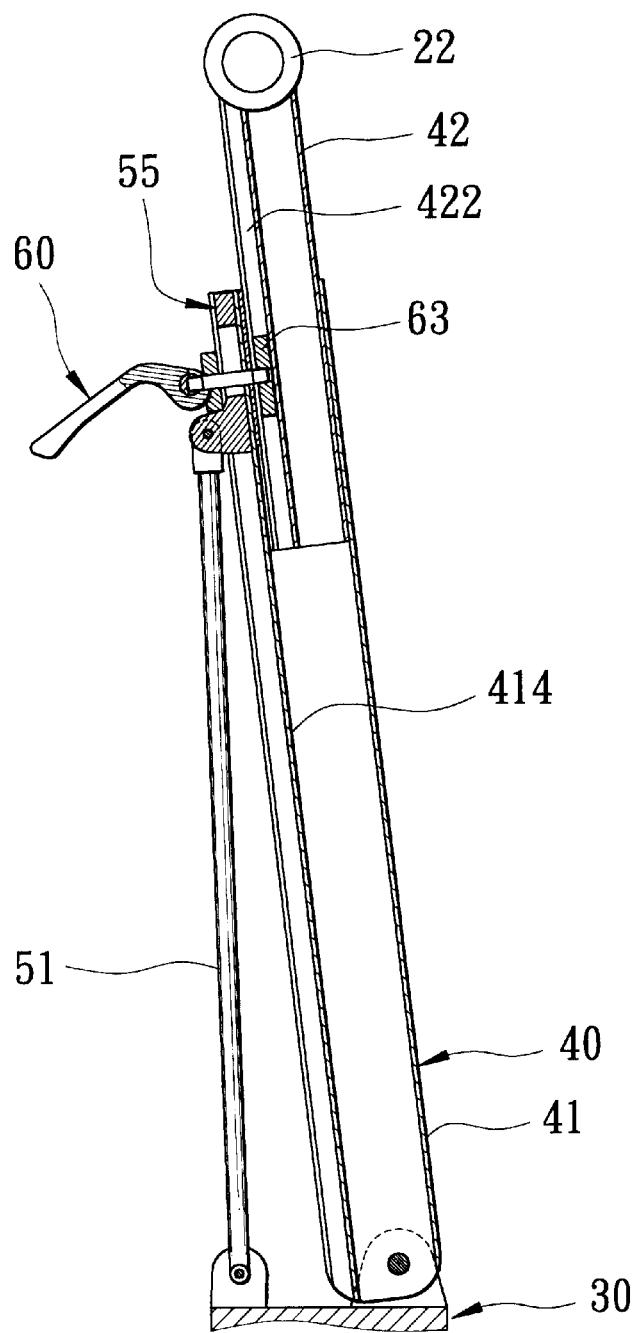

The locking unit 60 is preferably a quick-release device which includes a connecting shaft 613, an anchor member 63, an abutment block 62, a pivot pin 612, and an operating lever 61. The connecting shaft 613 extends through the slot 56" in the sliding plate 56 and the upper end 412 of the lever 41 and into the stem channel 415. The anchor member 63 is disposed within a groove 422 of the stem 42, which, in turn, is inserted in the stem channel 415. The anchor member 63 is secured to the connecting shaft 613 so as to prevent removal of the connecting shaft 613 from the lever 41. The connecting shaft 613 is movable in a transverse direction relative to the longitudinal direction. The abutment block 62 is sleeved on the connecting shaft 613, and has a first cam face 622. The pivot pin 612 extends in a transverse direction relative to the connecting shaft 613, and is secured to the connecting shaft 613. The operating lever 61 is pivoted to the pivot pin 612, and has a second cam face 611 which engages the first cam face 622 in such a manner that rotation of the operating lever 61 about the pivot pin 612 in a first direction results in movement of the connecting shaft 613 together with the abutment block 62 and the sliding plate 56 to abut against the partition plate 414 so as to immobilize the lever 41 relative to the frame 30, thereby positioning the locking unit 60 at the locking position. At the locking position, the abutment block 62 extends partially into the coupler channel 416 (see FIG. 5) by virtue of pressing action of the operating lever 61 so as to push the sliding plate 56 against the partition plate 414. Rotation of the operating lever 61 about the pivot pin 612 in a second direction opposite to the first direction results in disengagement of the sliding plate 56 from the partition plate 414, thereby positioning the locking unit 60 at the unlocking position. At the unlocking position, the abutment block 62 is exposed outwardly from the coupler channel 416 (see FIG. 6) since no compression force is applied on the abutment block 62 against the partition plate 414. Under this condition, the assembly of the lever 41 and the crank 51 can be pushed forward or rearward relative to the frame 30 so as to adjust the stem 42 relative to the frame 30, as best shown in FIG. 7. Prior to moving the lock unit 60 to the locking position, the height of the handle 22 relative to the frame 30 can also be adjusted, as illustrated in FIG. 8.

Figure 9:
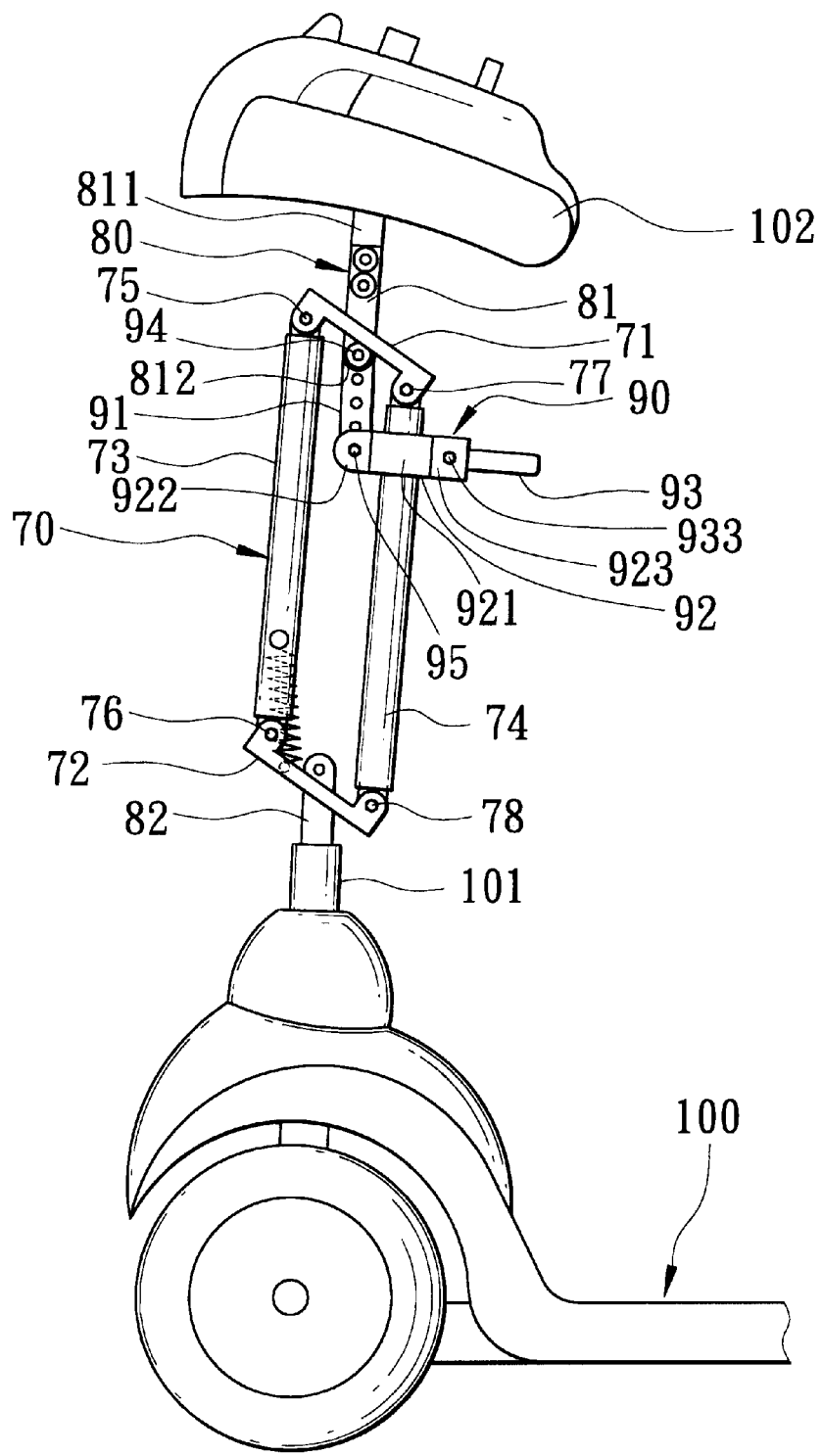
FIG. 9 is a fragmentary schematic view of a modified preferred embodiment of a bicycle according to the present invention.
Figure 10:
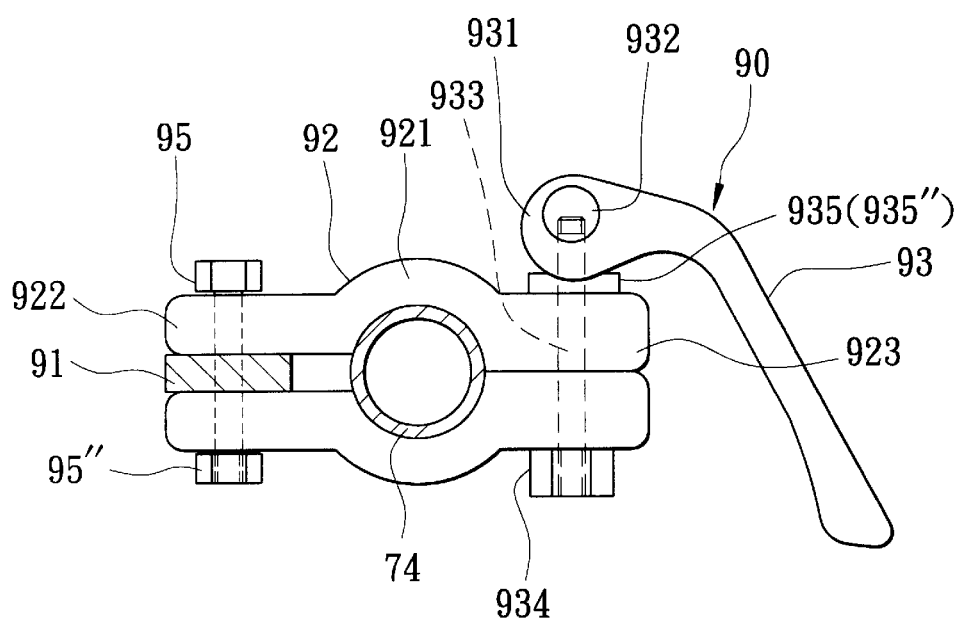
FIG. 10 is a partly cross sectional view of the modified preferred embodiment, illustrating the crank mechanism at a locking position.
Figure 11:
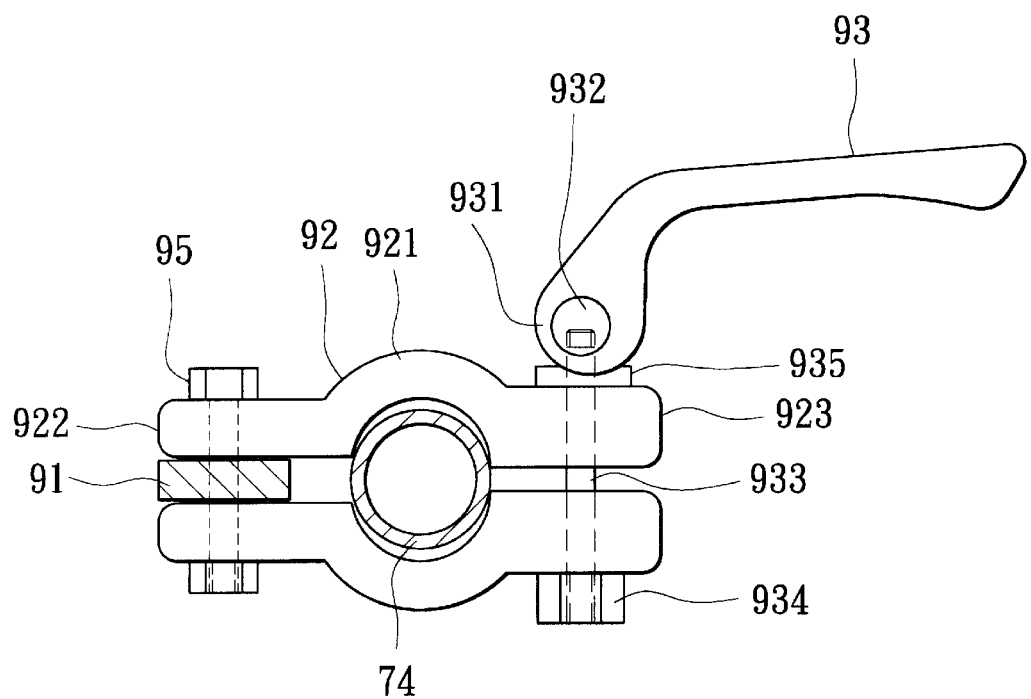
FIG. 11 is a partly cross sectional view of the modified preferred embodiment, illustrating the crank mechanism at an unlocking position.
Figure 12:
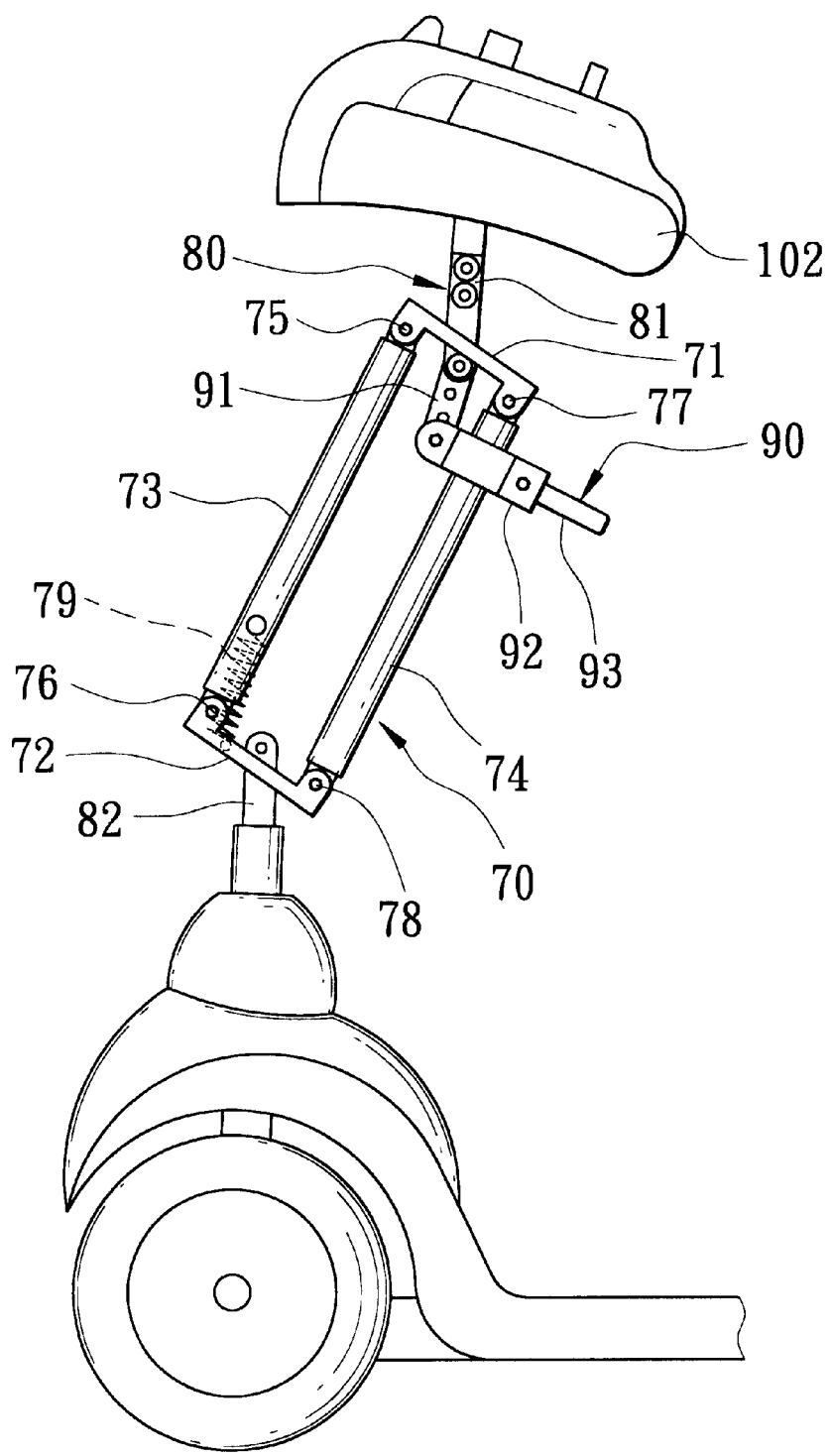
FIG. 12 is a fragmentary schematic view of the modified preferred embodiment, illustrating a position of the handle after adjustment.

Referring to FIGS. 9 and 10, a modified preferred embodiment of a power bike 100 according to the present invention is shown to be similar to the previous embodiment in structure. The main difference therebetween resides in that the crank mechanism 70 of the power bike 100 includes a coupler member 71 that is substantially parallel to the frame 72, and that has opposing front and rear ends respectively and pivotally connected to the upper ends of the lever 73 and the crank 74 via pivot pins 75, 77. The frame 72 is secured to the head tube 101 of the bike 100 via a connecting rod 82, and has opposing front and rear ends 76, 78 pivoted to lower ends of the lever 73 and the crank 74, respectively. A stem 80 includes a connecting rod 81 secured to the coupler member 71, and has an upper end 811 fixed to a handle 102 of the power bike 100, and a lower end 812 disposed below the coupler member 71 between the lever 73 and the crank 74. The lock unit 90 includes a linkage 91, left and right clamping plates 92, a fastener bolt 95, a first screw nut 95", a connecting shaft 933, a second screw nut 934, an abutment block 935, a pivot pin 932, and an operating lever 93. The linkage 91 has an upper end pivoted to the lower end 812 of the connecting rod 81 via a pivot pin 94. The left and right clamping plates 92 extend in a first transverse direction relative to the crank 74, and has two parallel front ends 922 disposed respectively at two opposite sides of the linkage 91, two parallel rear ends 923, and two C-shaped intermediate portions 921 which define a clamping space for extension of the crank 74 therethrough. The fastener bolt 95 extends through the front ends 922 of the clamping plates 92 and the linkage 91, and permits pivotal movement of the linkage 91 thereon about the fastener bolt 95. The first screw nut 95" threadedly engages the fastener bolt 95 so as to prevent removal of the linkage 91 from the clamping plates 92. The connecting shaft 933 extends through the rear portions 923 of the clamping plates 92 in a second transverse direction relative to the clamping plates 92, and has two opposite ends. The second screw nut 934 threadedly engages one of the opposite ends of the connecting shaft 933. The abutment block 935 is sleeved on the connecting shaft 933, and has a first cam face 935". The pivot pin 932 is secured to the other one of the opposite ends of the connecting shaft 933. The operating lever 93 is pivoted to the pivot pin 932, and has a second cam face 931 which engages the first cam face 935" in such a manner that rotation of the operating lever 93 about the pivot pin 932 in a first direction results in relative movement of the clamping plates 92 toward each other so as to clamp the crank 74 between the intermediate portions 921 of the clamping plates 92 and the linkage 91 between the front ends 922 of the clamping plates 92, as best shown in FIG. 10, thereby disposing the lock unit 90 at the locking position. Rotation of the operating lever 93 about the pivot pin 932 in a second direction opposite to the first direction results in relative movement of the clamping plates 92 away from each other so as to release clamping of the crank 74 from the intermediate portions 921 of the clamping plates 92, and clamping of the linkage 91 from the front ends 922 of the clamping plates 92, as best shown in FIG. 11, thereby disposing the lock unit 90 at the unlocking position. At the unlocking position, assembly of the lever 73 and the crank 74 can be pushed forward or rearward, as best shown in FIG. 12, so as to change the position of the handle 102 relative to the frame 72. Preferably, a tension spring 79 is used to connect the lever 73 and the frame 72 under tension in order to maintain relative positions of the lever 73 and the crank 74.

With this invention thus explained, it is apparent that numerous modifications and variations can be made without departing from the scope and spirit of this invention. It is therefore intended that the invention be limited only as indicated in the appended claims.

I claim:

1. A bicycle comprising:
   a handle;
   a stem extending downwardly from said handle;

a head tube;

a crank mechanism interconnecting said stem and said head tube, and including.

a frame fixed on said head tube, and having opposing front and rear ends, a lever pivoted to said front end of said frame, extending uprightly therefrom, and having an upper end, a crank pivoted to said rear end of said frame, extending uprightly therefrom, and having an upper end, and a coupler member pivoted to said upper end of said crank, and movably connected to said upper end of said lever so as to permit co-movement of said lever, said crank and said coupler member relative to said frame and so as to permit frontward and rearward movement of said handle together with said stem relative to said head tube;

a locking unit selectively and movably connected to two of said frame, said lever, said crank and said coupler member, and operable between a locking position, in which said locking unit locks said crank, said lever, and said coupler member against movement relative to said frame, and an unlocking position, in which said locking unit releases said crank, said lever and said coupler member so as to permit co-movement of said lever, said crank and said coupler member relative to said frame and so as to permit adjustment of said stem to a desired position relative to said frame;

wherein said coupler member is substantially parallel to said frame, and has opposing front and rear ends respectively and pivotally connected to said upper ends of said lever and said crank, said stem being secured to said coupler member and having a lower end disposed below said coupler member and between said lever and said crank, said locking unit being a quick-release device which includes, a linkage pivoted to said lower end of said stem, and left and right clamping plates extending in a first transverse direction relative to said crank and having two parallel front ends disposed respectively at two opposite sides of said linkage, two parallel rear ends, and two C-shaped intermediate portions which define a clamping space for extension of said crank therethrough, said locking unit further including a fastener bolt extending through said front ends and said linkage, a screw nut threadedly engaging said fastener bolt so as to prevent removal of said linkage from said clamping plates, a connecting shaft extending through said rear portions of said clamping plates in a second transverse direction relative to said clamping plates and having two opposite ends, a screw nut threadedly engaging one of said opposite ends of said connecting shaft, an abutment block sleeved on said connecting shaft and having a first cam face, a pivot pin disposed transverse to and secured to the other one of said opposite ends of said connecting shaft, an operating lever pivoted to said pivot pin and having a second cam face which engages said first cam face in such a manner that rotation of said operating lever about said pivot pin in a first direction results in relative movement of said clamping plates toward each other so as to clamp said crank between said intermediate portions of said clamping plates and said linkage between said front ends of said clamping plates, thereby disposing said lock unit at said locking position, rotation of said operating lever about said pivot pin in a second direction opposite to said first direction resulting in relative movement of said clamping plates away from each other so as to release clamping of said crank from said intermediate portions of said clamping plates and clamping of said linkage from said front ends of said clamping plates, thereby disposing said lock unit at said unlocking position.

* * * * *